(12) United States Patent
Asai et al.

(10) Patent No.: US 11,762,826 B2
(45) Date of Patent: Sep. 19, 2023

(54) SEARCH APPARATUS, SEARCH METHOD, PROGRAM AND RECORDING MEDIUM

(71) Applicant: NTT Communications Corporation, Chiyoda-ku (JP)

(72) Inventors: Hirochika Asai, Ota-ku (JP); Yasuhiro Ohara, Suginami-ku (JP)

(73) Assignee: NTT Communications Corporation, Chiyoda-ku (JP)

( * ) Notice: Subject to any disclaimer, the term of this patent is extended or adjusted under 35 U.S.C. 154(b) by 1129 days.

(21) Appl. No.: 15/556,527

(22) PCT Filed: Jan. 29, 2016

(86) PCT No.: PCT/JP2016/052664
§ 371 (c)(1),
(2) Date: Sep. 7, 2017

(87) PCT Pub. No.: WO2016/143405
PCT Pub. Date: Sep. 15, 2016

(65) Prior Publication Data
US 2018/0039662 A1    Feb. 8, 2018

(30) Foreign Application Priority Data
Mar. 11, 2015    (JP) .................................. 2015-048657

(51) Int. Cl.
*G06F 9/30*    (2018.01)
*G06F 16/22*    (2019.01)
(Continued)

(52) U.S. Cl.
CPC ...... *G06F 16/2246* (2019.01); *G06F 9/30036* (2013.01); *G06F 16/9027* (2019.01); *H04L 49/25* (2013.01)

(58) Field of Classification Search
CPC ............. G06F 16/2246; G06F 16/9027; G06F 9/30036; H04L 49/25
(Continued)

(56) References Cited

U.S. PATENT DOCUMENTS 5,664,172 A * 9/1997 Antoshenkov .... G06F 16/24524
707/700
5,836,014 A * 11/1998 Faiman, Jr. ............. G06F 8/443
717/156

(Continued)

FOREIGN PATENT DOCUMENTS

CN    102741841 A    10/2012
EP    2 515 245 A1    10/2012
(Continued)

OTHER PUBLICATIONS

Extended European Search Report dated Jun. 14, 2018 in Patent Application No. 16761377.7, 7 pages.
(Continued)

*Primary Examiner* — Mahesh H Dwivedi
(74) *Attorney, Agent, or Firm* — Oblon, McClelland, Maier & Neustadt, L.L.P.

(57) ABSTRACT

A search apparatus including: a storage configured to store search target data; and a calculator configured to perform search processing for the search target data based on key data, the search target data being data of a multiway tree structure including an internal node array and a leaf node array, each internal node includes a bit vector representing whether a transition destination is an internal node or a leaf node by a bit, and the calculator is configured to repeatedly execute, until a transition node becomes a leaf node, processing of obtaining a chunk of a predetermined bit length from the key data, determining whether a transition destination from the internal node is an internal node or a leaf node based on a bit, in the bit vector of the accessing internal node
(Continued)

node, that corresponds to a value of the chunk, and accessing a node of the transition destination.

14 Claims, 14 Drawing Sheets

(51) Int. Cl.
  *G06F 16/901* (2019.01)
  *H04L 49/25* (2022.01)
(58) Field of Classification Search
  USPC .......................................................... 707/797
  See application file for complete search history.

(56) References Cited

U.S. PATENT DOCUMENTS

| | | | |
|---|---|---|---|
| 6,829,695 B1* | 12/2004 | Ross | G06F 16/2237 |
| | | | 712/1 |
| 6,931,418 B1* | 8/2005 | Barnes | G06F 16/2264 |
| | | | 707/776 |
| 7,444,318 B2* | 10/2008 | Sahni | H04L 45/7457 |
| 8,086,641 B1* | 12/2011 | Carr | G06F 16/2246 |
| | | | 707/797 |
| 8,886,677 B1* | 11/2014 | Depelteau | G06F 16/2246 |
| | | | 707/797 |
| 9,553,771 B1* | 1/2017 | McKenna | G06F 16/2237 |
| 9,753,965 B2* | 9/2017 | Rana | H04W 64/00 |
| 2003/0091043 A1 | 5/2003 | Mehrotra et al. | |
| 2003/0208488 A1* | 11/2003 | Perrizo | G06F 16/9027 |
| 2005/0076010 A1* | 4/2005 | Bass | H04L 45/742 |
| 2008/0082805 A1* | 4/2008 | Wakabayashi | G06F 30/327 |
| | | | 712/236 |
| 2008/0275837 A1* | 11/2008 | Lambov | G06F 16/90344 |
| | | | 706/48 |
| 2011/0030057 A1* | 2/2011 | Chen | H04L 69/22 |
| | | | 726/23 |
| 2011/0080403 A1* | 4/2011 | Ernst | G06T 17/005 |
| | | | 345/420 |
| 2011/0173166 A1* | 7/2011 | Teerlink | G06F 16/283 |
| | | | 707/693 |
| 2012/0239664 A1 | 9/2012 | Shinjo et al. | |
| 2014/0188885 A1* | 7/2014 | Kulkarni | G06F 16/2255 |
| | | | 707/739 |

FOREIGN PATENT DOCUMENTS

| | | |
|---|---|---|
| JP | 2000-083054 A | 3/2000 |
| JP | 2001-517024 A | 10/2001 |
| JP | 2004-537921 A | 12/2004 |
| WO | 1999/014906 | 3/1909 |

OTHER PUBLICATIONS

Combined Chinese Office Action and Search Report dated Jan. 13, 2020, in Patent Application No. 201680014265.4, 19 pages (with English translation and English Translation of Category of Cited Documents).

International Search Report dated Mar. 1, 2016 in PCT/JP2016/052664 filed Jan. 29, 2016.

Japanese Office Action dated Mar. 1, 2016 in Application No. JP 2015-048657 filed Mar. 11, 2015.

* cited by examiner

FIG.16

(a)  leaf array: ABAA BBBA BCBB CCCC (b)  leaf mask: 0100 1110 1011 0000 (big endian)
     leaf array: AAAA AAAA ACCC CCCC (c)  leaf vector: 1000 0000 0100 0000 (big endian)
     leaf array: AC (d)  leaf mask: 0100 1110 1011 0000 (big endian)
     masked leaf: B
     leaf vector: 1000 0000 0100 0000 (big endian)
     leaf array: AC

SEARCH APPARATUS, SEARCH METHOD, PROGRAM AND RECORDING MEDIUM

TECHNICAL FIELD

The present invention relates to a search technique for obtaining desired data by searching search target data represented as a tree structure.

BACKGROUND ART

In an apparatus such as a router and the like, processing is performed for determining a transfer destination of a packet by searching a routing table based on a destination address of a received packet. In the processing, longest match search is performed. For that purpose, in the conventional technique, Patricia trie (Trie), Radix tree (radix tree) and the like was used. In the conventional technique, techniques of binary tree are mainstream, and the performance is at most a few Mlps (Mega Lookup per second). Techniques of multiway tree (N-ary/Multiway) were also invented, but those were not mainstream in practical use. Since these performances are not desirable, hardware called TCAM that realizes hundreds of Mlps is the de facto standard. TCAM has difficulties in economy, density, scale, power consumption and heat generation.

In order to overcome the problem of TCAM, a technique for searching a route by combining a commercially available device and software has been recently appearing. Packet-Shader, GPU Click, GAMT, and the like realize high route search performance using GPU, but because it uses GPU, it has the heat problem and so on like TCAM. Note that patent document 1 is a prior art document.

RELATED ART DOCUMENT

Patent Document

[PATENT DOCUMENT 1] JP2000-083054

SUMMARY OF THE INVENTION

Problem to be Solved by the Invention

As mentioned above, since using a specific device such as the TCAM or the GPU or the like has problems such as heat generation, it is not preferable to speed up the route search by using the specific device.

Techniques (example: DXR, SAIL) for speeding up route search by software with general-purpose hardware (example: commercially available CPU etc.) without presupposing use of the specific hardware have been proposed. However, the techniques have a problem that the performance is degraded, when the number of routes in the routing table becomes large or when the address length becomes long.

In search processing using general-purpose hardware, the problem that the search performance deteriorates when the data scale of search target data becomes large or when the key data length becomes long occurs, being not limited to the route search.

The present invention is contrived in view of the above-mentioned points, and an object thereof is to provide a technique that enables high-speed search of search target data represented by a tree structure even when general-purpose hardware is used.

Means for Solving the Problem

According to an embodiment of the present invention, there is provided a search apparatus including:
storage means configured to store search target data; and
calculation means configured to perform search processing for the search target data based on key data, wherein
the search target data stored in the storage means is data of a multiway tree structure including an internal node array and a leaf node array,
each internal node in the search target data includes a bit vector representing whether a transition destination is an internal node or a leaf node by a bit, and wherein
the calculation means is configured to repeatedly execute, until a transition node becomes a leaf node, processing of
obtaining a chunk of a predetermined bit length from the key data, determining whether a transition destination from the internal node is an internal node or a leaf node based on a bit, in the bit vector of the accessing internal node, that corresponds to a value of the chunk, and accessing a node of the transition destination.

According to an embodiment of the present invention, there is provided a search method executed by a search apparatus including: storage means configured to store search target data; and calculation means configured to perform search processing for the search target data based on key data
wherein the search target data stored in the storage means is data of a multiway tree structure including an internal node array and a leaf node array,
each internal node in the search target data includes a bit vector representing whether a transition destination is an internal node or a leaf node by a bit,
the search method including: repeatedly executing, until a transition node becomes a leaf node, processing of
obtaining a chunk of a predetermined bit length from the key data, determining whether a transition destination from the internal node is an internal node or a leaf node based on a bit, in the bit vector of the accessing internal node, that corresponds to a value of the chunk, and accessing a node of the transition destination.

Effect of the Present Invention

According to an embodiment of the present invention, it becomes possible to search search target data, at high speed, represented by a tree structure even when general-purpose hardware is used.

BRIEF DESCRIPTION OF THE DRAWINGS

FIG. 16 is a diagram for explaining a data generation method on a leaf mask.

EMBODIMENTS FOR CARRYING OUT THE INVENTION

In the following, an embodiment of the present invention is described with reference to figures. Note that the embodiments described below are merely examples, and embodiments to which the present invention is applied are not limited to the following embodiments.

(As to Search Method)

In the present embodiment, as an example of an application destination of the search technique of the present invention, processing is assumed in which a router searches a routing table (more specifically, a forwarding table) with longest match by using a destination address of a received packet as a key, thereby acquiring information of a next hop as a transfer destination of the packet. However, the application of the present invention is not limited to this, and the present invention is not limited to the longest match but can be applied to various kinds of searches such as perfect match. Hereinafter, data to be searched (search) is referred to as search target data, and data serving as a search key such as a destination address is referred to as key data.

In the present embodiment, as a method of searching search target data, a multiway radix search method represented by a multiway tree is used. Thus, first, an outline of a multiway radix search method is described with reference to FIG. 1.

Figure 1:
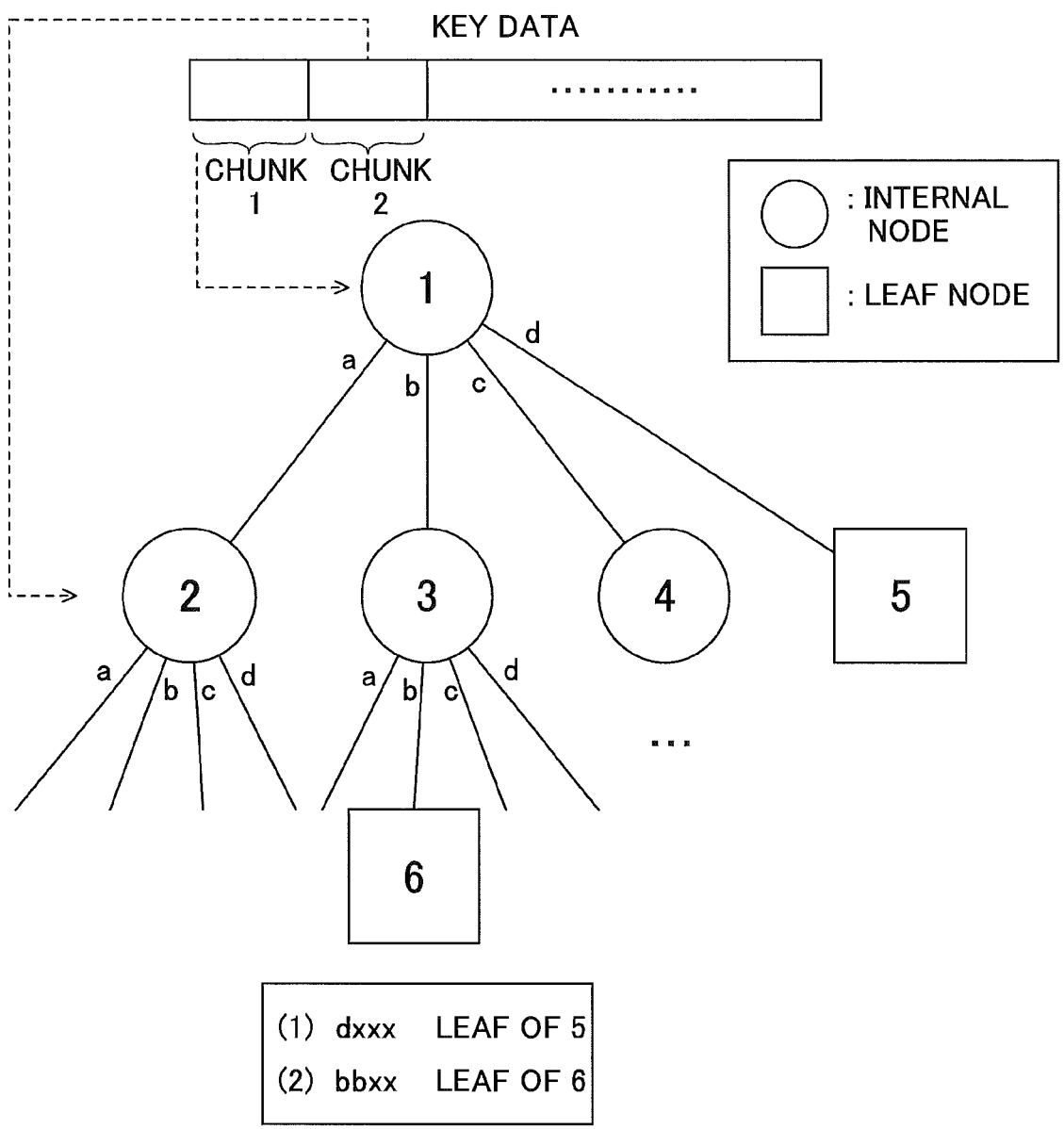
FIG. 1 is a diagram for explaining a multiway radix search method.

In the multiway radix search method, the key data is divided into a predetermined number of plural bits (hereinafter referred to as a chunk) from the head, so that transition of a tree is performed every plural bits. FIG. 1 is an example in which each chunk consists of two bits. Since each chunk can take four kinds of values (represented as a, b, c, d in FIG. 1), each node in the tree branches in four directions. The branch destination is an internal node (a node indicated by a circle in FIG. 1) or a leaf node (a node indicated by a square in FIG. 1).

A search is started at a first stage node from the first chunk in the key data, and branched into a child node of a corresponding value, then the key is advanced to the next chunk, so that search is sequentially performed. When it reaches a leaf node, the search ends.

In the example of FIG. 1, for example, when the key data is dxxxx (x is an arbitrary value), it reaches the leaf node indicated by 5. When the key data is bbxx, it reaches the leaf node indicated by 6. For example, information indicating a next hop (example: address, IF information, etc.) is stored in a leaf node. When it reaches a leaf node, information on the next hop corresponding to the key data can be acquired.

The above example is an example in which the chunk length is 2 bits. However, for example, when using a 64 bit CPU architecture, in order to make computation efficient by using the same bit width, the chunk length is set to 6 bits, so that a data structure in which there are 64 branches in each node can be used.

In the above-described multiway radix search method, generally, each node has pointers (each being an address for storing a child node), the number of which is the number of branches, each of which is for pointing a child node. However, since each pointer designates a child node using 64 bits, for example, there is a problem in that the whole data amount becomes very large. Therefore, according to the configuration using pointers as described above, there is a problem in that data of the tree cannot be stored in a cache of the general-purpose CPU and the data must be stored in a memory outside the CPU, so that the search speed deteriorates.

On the other hand, according to the technique of the present embodiment, compared to the above-mentioned technique, data amount of each internal node can be largely reduced, and nodes having the same data can be compressed, so that the whole tree data amount can be made small, and it becomes possible to perform processing by storing data of a tree in a cache of a general-purpose CPU. Therefore, even when general-purpose hardware such as a general-purpose CPU is used, high-speed search processing becomes possible. In the following, the technique according to this embodiment is described in more detail.

(Apparatus Configuration Example)

Figure 2:
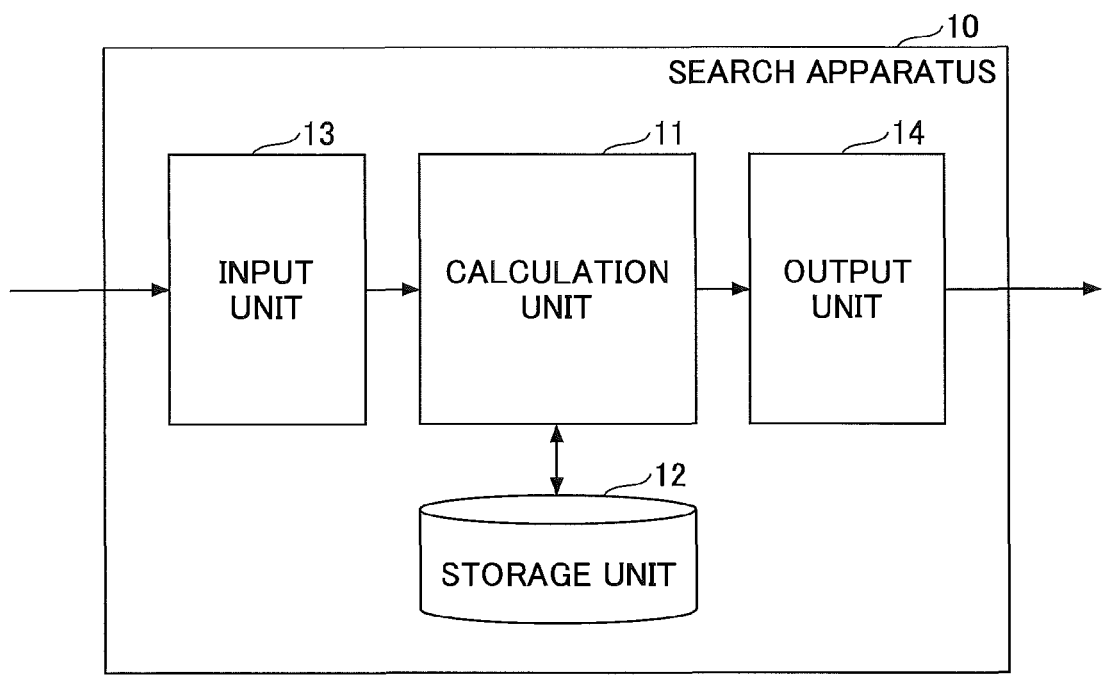
FIG. 2 is a block, diagram of a search apparatus 10 in an embodiment of the present invention.

First, a configuration example of a search apparatus that executes search processing of the present embodiment is described. FIG. 2 is a diagram showing a configuration example of a search apparatus 10 of the present embodiment.

As shown in FIG. 2, the search apparatus 10 includes a calculation unit 11, a storage unit 12, an input unit 13 and an output unit 14. The calculation unit 11 is a functional unit configured to execute search processing for search target data by using key data by an after-mentioned method. The storage unit 12 is a functional unit configured to store search target data. The input unit 13 is a functional unit configured to input key data. The output unit 14 is a functional unit configured to output a search result.

For example, the search apparatus 10 is a general-purpose computer, and the calculation unit 11 and the storage unit 12 form a CPU. In this case, the storage unit 12 corresponds to a cache in the CPU. Also, a part of the storage unit 12 may be a memory outside the CPU. The CPU operates in accordance with a program having a processing logic according to the present embodiment. The program is stored in the storage unit 12. The program may be stored in a storage unit such as a memory other than the storage unit 12.

The program may be stored in a storage medium such as a portable memory and the like, and loaded in a general-purpose computer from the portable memory, so that the computer can be used as the search apparatus 10.

Also, the calculation unit 11 and the storage unit 12 can be configured as an apparatus in which a processing logic of the present embodiment is embedded as a hardware circuit.

Figure 3:
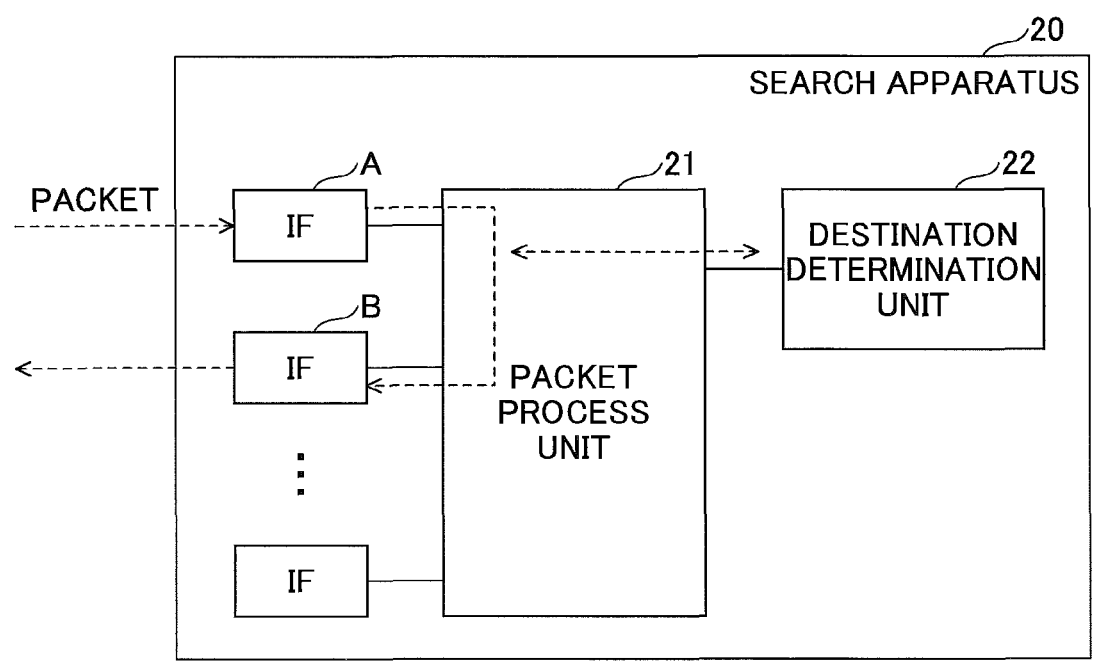
FIG. 3 is a diagram showing a search apparatus 20 in an embodiment of the present invention.

FIG. 3 shows a search apparatus 20 which is another example of the search apparatus of the present embodiment. The search apparatus 20 is an apparatus that functions as a router, for example. As shown in FIG. 3, the search apparatus 20 includes a packet processing unit 21, a destination determination unit 22, and a plurality of interfaces (IF). The packet processing unit 21 receives a packet via an IF, and outputs the packet from an IF corresponding to a destination (next hop) determined by the destination determination unit 22. FIG. 3 shows an example in which a packet is received from an IF-A and outputted from an IF-B.

The destination determination unit 22 includes a storage unit for storing a routing table (forwarding table). The destination determination unit 22 receives a destination address of a packet from the packet processing unit 21 as key data, and determines the next hop of the packet by searching the forwarding table based on the key data to output information of the next hop to the packet processing unit 21. The search apparatus 10 shown in FIG. 2 can be utilized as the destination determination unit 22, for example.

In the following, search processes executed by the search apparatus 10 is described in detail. In the following, a scheme for performing basic processing is described as an example 1, and examples in which functions that enable node compression for the example 1 are added are described as examples 2-4.

EXAMPLE 1

Figure 4:
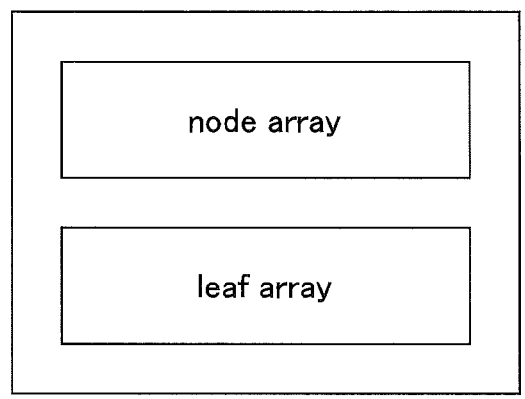
FIG. 4 is a diagram showing an example of search target data stored in a storage unit 12.

FIG. 4 shows an example of search target data stored in the storage unit 12 of the search apparatus 10. FIG. 4 is common to examples 1-4. As described before, in the present embodiment, since search processing based on the multiway radix search method is performed, the search target data includes a node array (node array) that holds data of each internal node of the tree, and a leaf array (leaf array) that is data of each leaf node in the tree. Data of each node stored as the array can be accessed by designating an index of each array.

The search target data including the leaf array and the node array may be stored in a storage medium such as a portable memory and the like, for example, and is loaded on the search apparatus 10 from the portable memory, so that the search apparatus 10 can be used as a search apparatus for the search target data. The search target data can be also loaded in the search apparatus 10 via a network from a computer.

Figure 5:
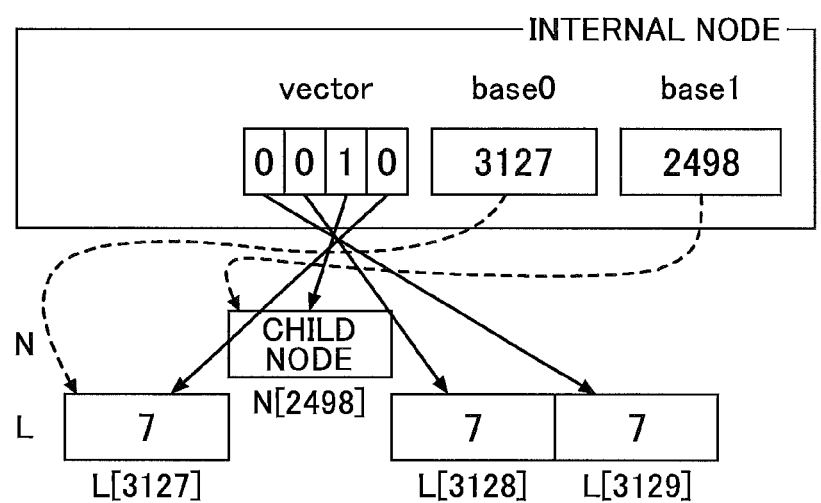
FIG. 5 is a diagram for explaining a structure of search target data and an outline of search processing in the present embodiment.

A data structure of an internal node in the example 1 is described with reference to FIG. 5. FIG. 5 is an example of the case in which the bit length of the chunk is two, that is, each node of the tree branches to four directions. However, the same structure is applied for any bit length of the chunk.

As shown in FIG. 5, the internal node includes a vector, a base0 and a base1. The vector is a bit vector that includes bits the number of which is the number of branches from the internal node. When the chunk of the key data is two bits, it can take four kinds of values of 00, 01, 10 and 11. Each bit of the vector corresponds to each of the above four kinds of values in an order from the right end. Note that "from the right end" is an example, and it may be "from the left end". For example, when using a little endian CPU, it is counted from the right end, and when using a big endian CPU, it is counted from the left end.

In the example of FIG. 5, for example, the rightmost (0-th) bit of the vector corresponds to the chunk 00, the first bit corresponds to the chunk 01, the second bit corresponds to the chunk 10, and the third bit corresponds to the chunk 11. Each bit of the vector indicates whether the transition destination (child node) from the internal node is an internal node or a leaf node. In the present embodiment, 1 indicates an internal node and 0 indicates a leaf node. However, this is an example, and the system may be configured such that 1 indicates a leaf node and 0 indicates an internal node.

For example, in the case in which the chunk corresponding to the internal node shown in FIG. 5 is 01 of 00, 01, 10, and 11, the calculation unit 11 refers to the first bit (1) counted from the 0-th bit of the vector, so as to ascertain that the next node is an internal node. Also, for example, in the case in which the chunk is 00 of 00, 01, 10, and 11, the calculation unit 11 refers to the 0-th bit (0) of the vector, so as to ascertain that the next node is a leaf node.

As described above, the calculation unit 11 can ascertain whether a transition destination node is an internal node or a leaf node by the vector. However, in this state, in order to acquire data of an internal node/leaf node, it is not known which index of element in the node array/leaf array should be accessed. Therefore, in the present embodiment, the internal node holds the base0 and the base1.

The base1 holds a storing start index of a child internal node corresponding to bit 1 of the vector in the internal node in the node array. The base0 holds a storing start index of a child leaf node corresponding to bit 0 of the vector in the internal node in the leaf array.

In the present embodiment, in the node array, as to each internal node, pieces of data of child internal nodes of the internal node are stored in an order of index. For example, in the case in which there are three child internal nodes for an internal node, the three pieces of data of the child internal nodes are stored in the node array as three pieces of data whose indices are consecutive. The index of data whose index is the top (smallest) among the three pieces of data is the base1.

Also, in the leaf array, as to each internal node, pieces of data of child leaf nodes of the internal node are stored in an order of index. For example, in the case in which there are three child leaf nodes for an internal node, the three pieces of data of the child leaf nodes are stored in the leaf array as three pieces of data whose indices are consecutive. The index of data whose index is the top (smallest) among the three pieces of data is the base0. Note that the index used in the present embodiment is an indicator indicating a storing location, and this may be replaced with "address".

Since data is stored in the node array/leaf array in the above-mentioned way, the calculation unit 11 accesses data of a child internal node/leaf node by using base0/base1 as described next.

As to an access to a child internal node of a bit position (it is assumed to be v-th position counted from 0-the position) in the vector, the calculation unit 11 calculates (counts) the number of 1s in bit positions from 0-th position to v-th position of the vector. That is, the calculation unit 11 calculates the number of 1s in (v+1) bits from the right end of the vector. If this number is represented as bc (bit count), the calculation unit 11 accesses an index of a value (bc+base1−1) obtained by subtracting 1 from a value obtained by adding base1 to bc in the node array so as to be able to obtain data of the internal node.

As to an access to a child leaf node of a bit position (it is assumed to be v-th position counted from 0-the position) in the vector, the calculation unit 11 calculates (counts) the number of 0s in bit positions from 0-th position to v-th position of the vector. That is, the calculation unit 11 calculates the number of 0s in (v+1) bits from the right end of the vector. If this number is represented as bc (bit count), the calculation unit 11 accesses an index of a value (bc+base0−1) obtained by subtracting 1 from a value obtained by adding base0 to bc in the leaf array so as to be able to obtain data of the leaf node.

FIG. 5 shows accessing a child internal node (Index: 2498) and child leaf nodes (Index: 3127~3129) in the above-mentioned way.

In general, the CPU has a function called popcnt which calculates the number of bits at high speed. In the present embodiment, this function can be effectively utilized so that high speed search can be performed. Note that using popcnt is an example, and popcnt may not be used.

Figure 6:
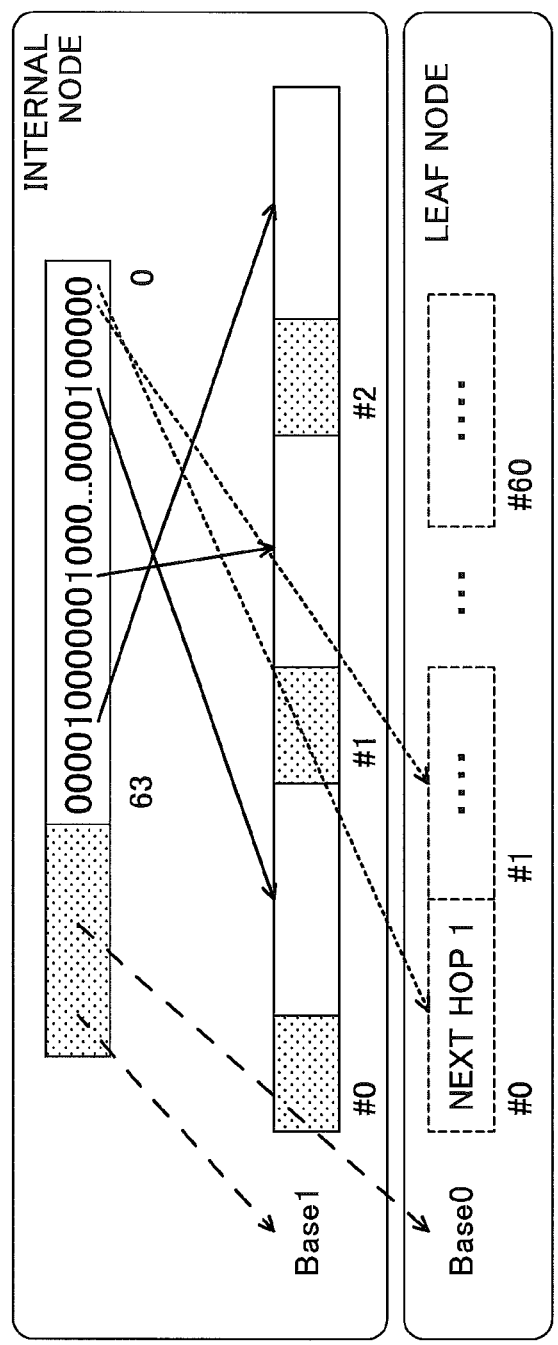
FIG. 6 is a diagram showing a more concrete example of an internal node and a leaf node.

FIG. 5 shows an example in which the chunk length is 2 bits, that is, the vector is 4 bits. However, this is an example, and the chunk length/vector may be other lengths. FIG. 6 shows an example in which the chunk length is 6 bits, that is, the vector is 64 ($2^6$) bits. FIG. 6 shows, as already described, that the internal node includes vector, base0/base1, and that a child internal node/leaf node can be accessed by bit counts and base0/base1.

In the present embodiment, the internal node only needs to have a bit vector and two bases. Compared with the scheme having pointers for each branch, the data amount of each node can be largely reduced, and as a result, the data amount of search target data can be reduced.

Figure 7:
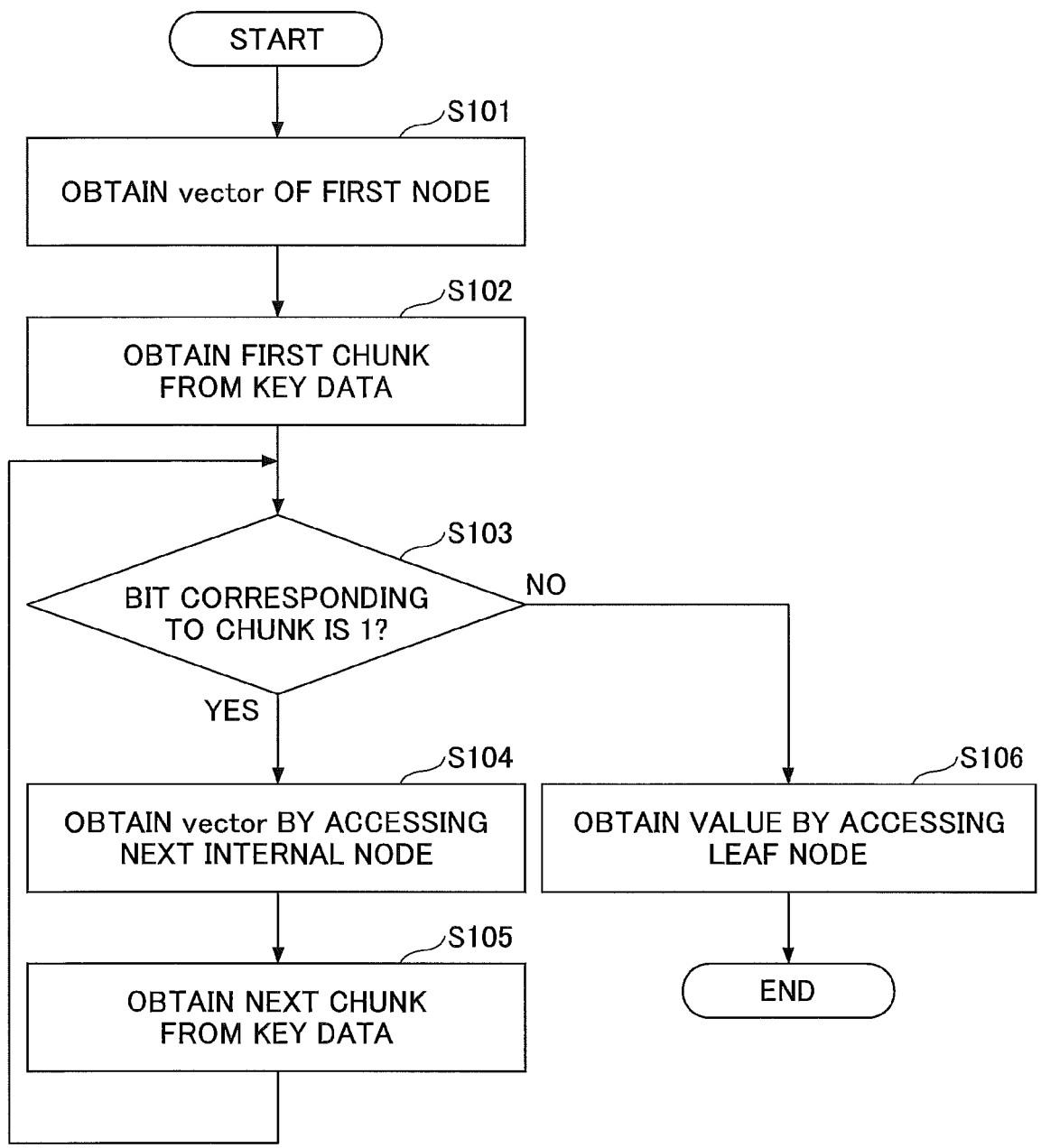
FIG. 7 is a flowchart for explaining a procedure of search processing.

With reference to FIG. 7, a process procedure of search processing executed by the calculation unit 11 is described. As a premise of this processing, it is assumed that key data has been input to the calculation unit 11 and search target data (node array/leaf array) having the above-described structure has been stored in the storage unit 12. FIG. 7 shows an example in which the search processing is terminated by reaching a leaf node.

The calculation unit 11 obtains a vector from a first internal node in the node array (step 101), and obtains a first chunk from the key data (step 102).

The calculation unit 11 reads a bit at a position of the vector corresponding to the chunk to determine whether the bit is 1 (step 103). When the bit is 1, as described before, the calculation unit 11 calculates the bit count bc, and accesses an internal node stored in an index of (bc+base1−1) to obtain a vector of the internal node (step 104).

The calculation unit 11 obtains a next chunk from the key data (step 105), and executes the determination of step 103 again.

As a result of determination of step 103, when a bit of the position of the vector corresponding to the chunk is 0 (No in step 103), the process goes to step 106. In step 106, as described before, the calculation unit 11 calculates the bit count bc, and accesses a leaf node stored at an index of (bc+base0−1) to obtain a value of the leaf node.

Note that, for example, in a forwarding table, since the length of prefixes that are leafs tends to concentrate in a specific range (example: /11~/24), it is possible to reach a target entry directly by omitting search of initial nodes. This is called direct pointing. An example is described with reference to FIGS. 8A and 8B

Figure 8A:
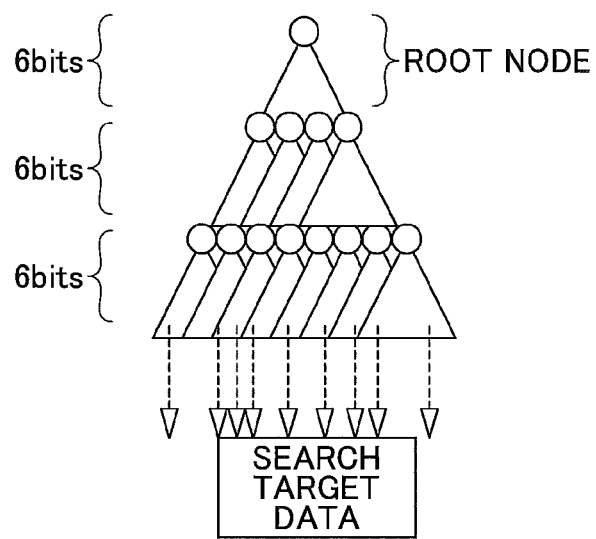
FIG. 8A is a diagram for explaining direct pointing.
Figure 8B:
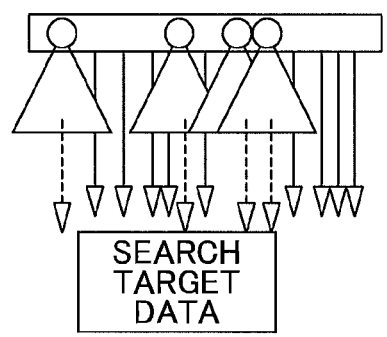
FIG. 8B is a diagram for explaining direct pointing.

FIG. 8A shows an example in which direct pointing is not performed. In this example, search is performed using chunks each having 6 bits. FIG. 8B shows an example of direct pointing in which search is performed using a 12-bit chunk first. Also in the case of FIG. 8B, when a leaf node cannot be reached by the chunk, search is performed using chunks each having 6 bits after that, for example, in the same way as that described above. The direct pointing can also be applied to other examples.

EXAMPLE 2

Next, as an example 2, a scheme in which leaf nodes can be compressed for the scheme described in the example 1 is described. For example, when applying the scheme of the example 1 to search of a forwarding table, it can be considered that many leaf nodes having overlapping values (next hops) occur. In the example 2, based on the scheme of the example 1, leaf nodes can be held by compressing them. In the following parts different from the example 1 are mainly described.

Figure 9:
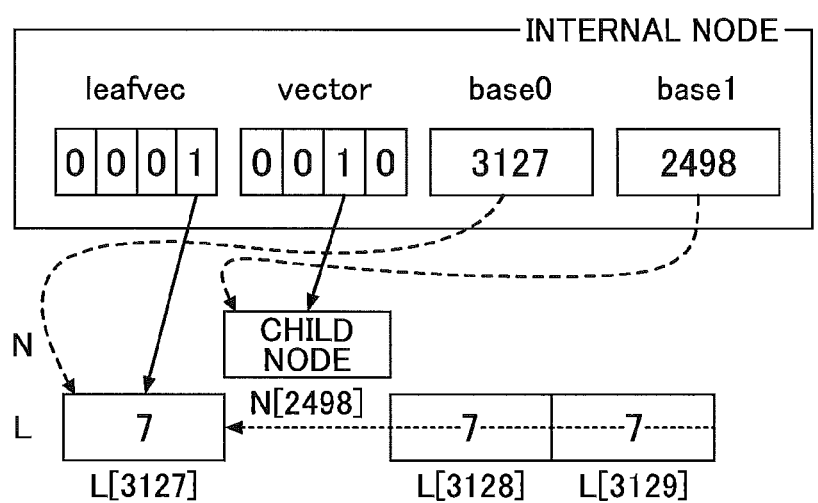
FIG. 9 is a diagram for explaining a compression example of data of a leaf node.

FIG. 9 is a diagram showing an internal node in the example 2. As shown in FIG. 9, in the example 2, a leafvec is added in addition to the vector, the base0, and the base1 described in the example 1. The bit length of the leafvec is the same as that of the vector.

As to leaf nodes each becoming a child of each internal node (that is, leaf nodes of each stage) in the leaf array, only a first leaf node at which consecution starts is held for consecutive leaf nodes having the same value. In the example of FIG. 9, as to leaf nodes of indices of 3127, 3128, and 3129, all of the values are the same, and it is 7. In this case, only the leaf node of index of 3127 is held. As a result of such a compression, even when there are a plurality of leaf nodes, a plurality of leaf nodes having the same value are not included, and each leaf node has a different value.

The element of the leafvec is a bit of 0 or 1, and 1 is assigned at a bit corresponding to a position at which consecution of leaf nodes before compression starts, from the right end. For example, in the example of FIG. 9, since consecution starts from the first leaf node, 1 is set to the first (0-th) bit corresponding to the first leaf node. Also, in the case in which consecution ends so that a leaf node of another value starts (when a leaf node changes), 1 is set at the position. The case in which a leaf node changes includes the first leaf node. The "consecution" here includes the case of one leaf node. That is, when every piece of data of leaf nodes is different, 1 is set to every bit position of the leafvec corresponding to the leaf nodes. Usage of the leafvec is as follows.

When the calculation unit 11 detects that a bit (it is assumed to be a v-th bit counted from 0-th bit) of the vector corresponding to a chunk is 0, the calculation unit 11 ascertains that the child is a leaf node. The calculation unit 11 calculates the number of bits of 1 in the bits (v+1 bits) counted from the 0-th bit of the right end up to the v-th bit. Assuming that the number is bc, like the case of vector, the calculation unit 11 accesses a leaf node of an index of (bc+base0−1).

Figure 10:
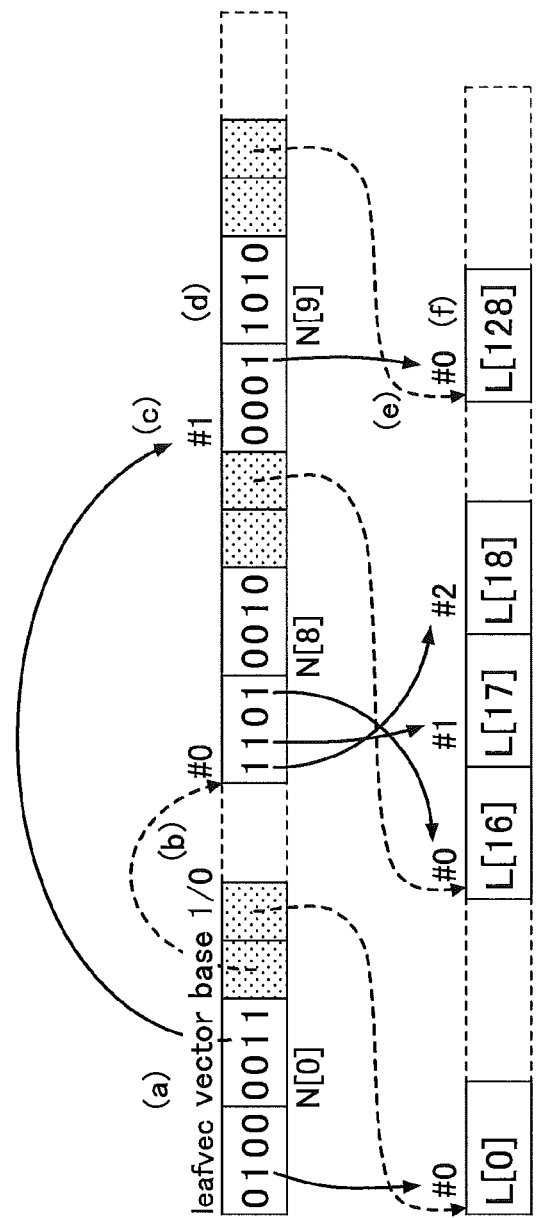
FIG. 10 is a diagram for explaining an example of a data structure in a compression example.

FIG. 10 shows a data example of an internal node and a leaf node in the example 2. In the example of FIG. 10, it is shown that the calculation unit 11 detects that the first bit counted from the 0-th bit of the vector in the internal node shown as (a) is 1 based on the chunk, and accesses an internal node of (c) corresponding to it. Also, for example, in the internal node of (a), when the chunk corresponds to the second bit (0) counted from the 0-th bit, the calculation unit 11 calculates the number of 1s in 3 bits up to the second bit in the leafvec, and accesses a leaf node (L(0)) corresponding to the number using the base0.

Compression of leaf nodes may be realized by a method other than the method using leafvec as described above. In the following, another method on compression of leaf nodes is described as an example 3. Note that the method of the example 3 is substantially the same as the method using the leafvec.

EXAMPLE 3

Figure 11:
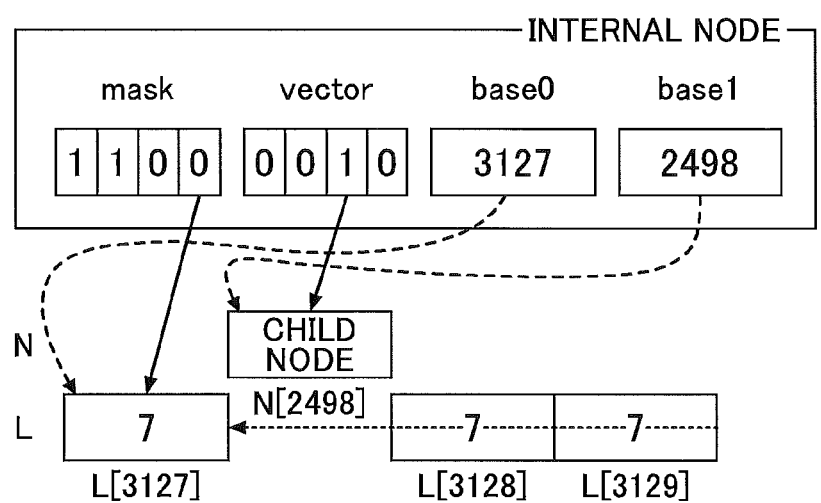
FIG. 11 is a diagram for explaining a compression example of data of a leaf node.

FIG. 11 is a diagram showing an internal node in the example 3. As shown in FIG. 11, in the example 3, a mask is added in addition to the vector, the base0, and the base1 described in the example 1. The bit length of the mask is the same as that of the vector.

As to leaf nodes each becoming a child of each internal node (that is, leaf nodes of each stage) in the leaf array, only a first leaf node at which consecution starts is held for consecutive leaf nodes having the same value. In the example of FIG. 11, as to leaf nodes of indices of 3127, 3128, and 3129, all of the values are the same, and it is 7. In this case, only the leaf node of index of 3127 is held. As a result of such a compression, even when there are a plurality of leaf nodes, a plurality of leaf nodes having the same value are not included.

The element of the mask is a bit of 0 or 1, and 0 is assigned at a bit corresponding to a position at which consecution of leaf nodes before compression starts, from the right end, and 1 (mask) is assigned at positions of consecutive lead nodes having the same value from the start position. Also, in the case in which consecution ends so that a leaf node of another value starts (when a leaf node changes), 0 is set at the position. The case in which a leaf node changes includes the first leaf node.

Note that, although either 1 or 0 may be set at a position corresponding to an internal node, 0 is used in this example. In the example of FIG. 11, since three leaf nodes are consecutive, 0 is set at a bit position corresponding to the first leaf node, and 1, which is a mask, is set at bit positions corresponding to leaf nodes afterwards. The usage of the mask is as follows.

When the calculation unit 11 detects that a bit (it is assumed to be a v-th bit counted from 0-th bit) of the vector corresponding to a chunk is 0, the calculation unit 11 ascertains that the child is a leaf node. In the example 3, the calculation unit 11 performs OR calculation on the vector and the mask, and the calculation unit 11 calculates the number of bits of 0 in the bits (v+1 bits) counted from the 0-th bit of the right end up to the v-th bit of the vector on which OR calculation has been performed. Assuming that the number is bc, the calculation unit 11 accesses a leaf node of an index of (bc+base0−1).

Figure 12:
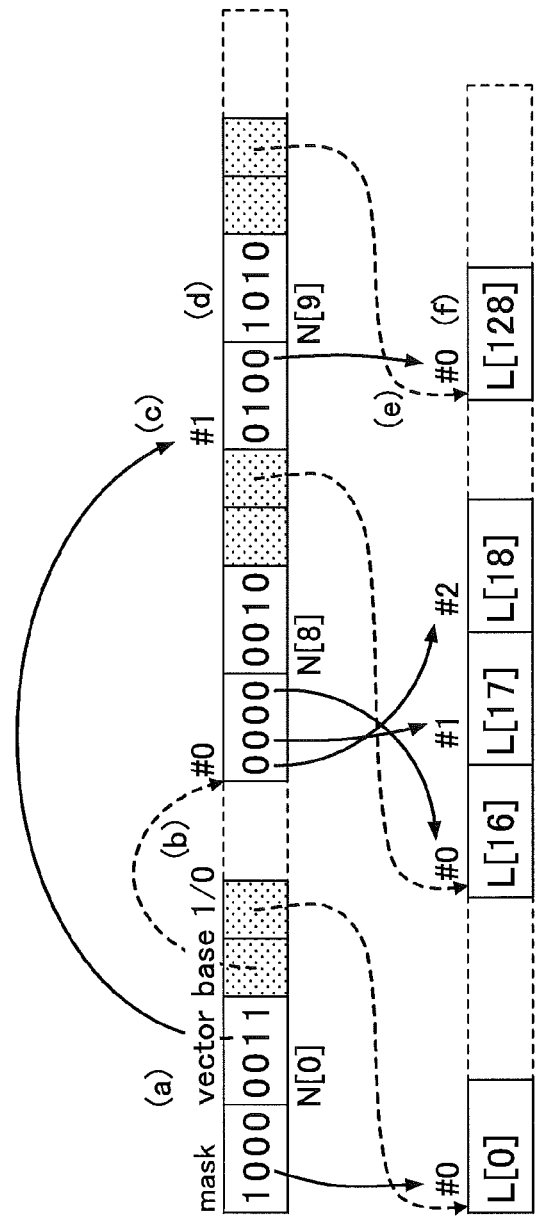
FIG. 12 is a diagram for explaining an example of a data structure in a compression example.

FIG. 12 shows a data example of an internal node and a leaf node in the example 3. In the example of FIG. 12, it is shown that the calculation unit 11 detects that the first bit counted from the 0-th bit of the vector in the internal node shown, as (a) is 1 based on the chunk, and accesses an internal node of (c) corresponding to it. Also, for example, in the internal node of (a), when the chunk corresponds to the second bit (0) counted from the 0-th bit, the calculation unit 11 calculates the number of 0s in 3 bits up to the second bit in the vector after mask operation, and accesses a leaf node (L(0)) corresponding to the number using the base0.

Figure 13:
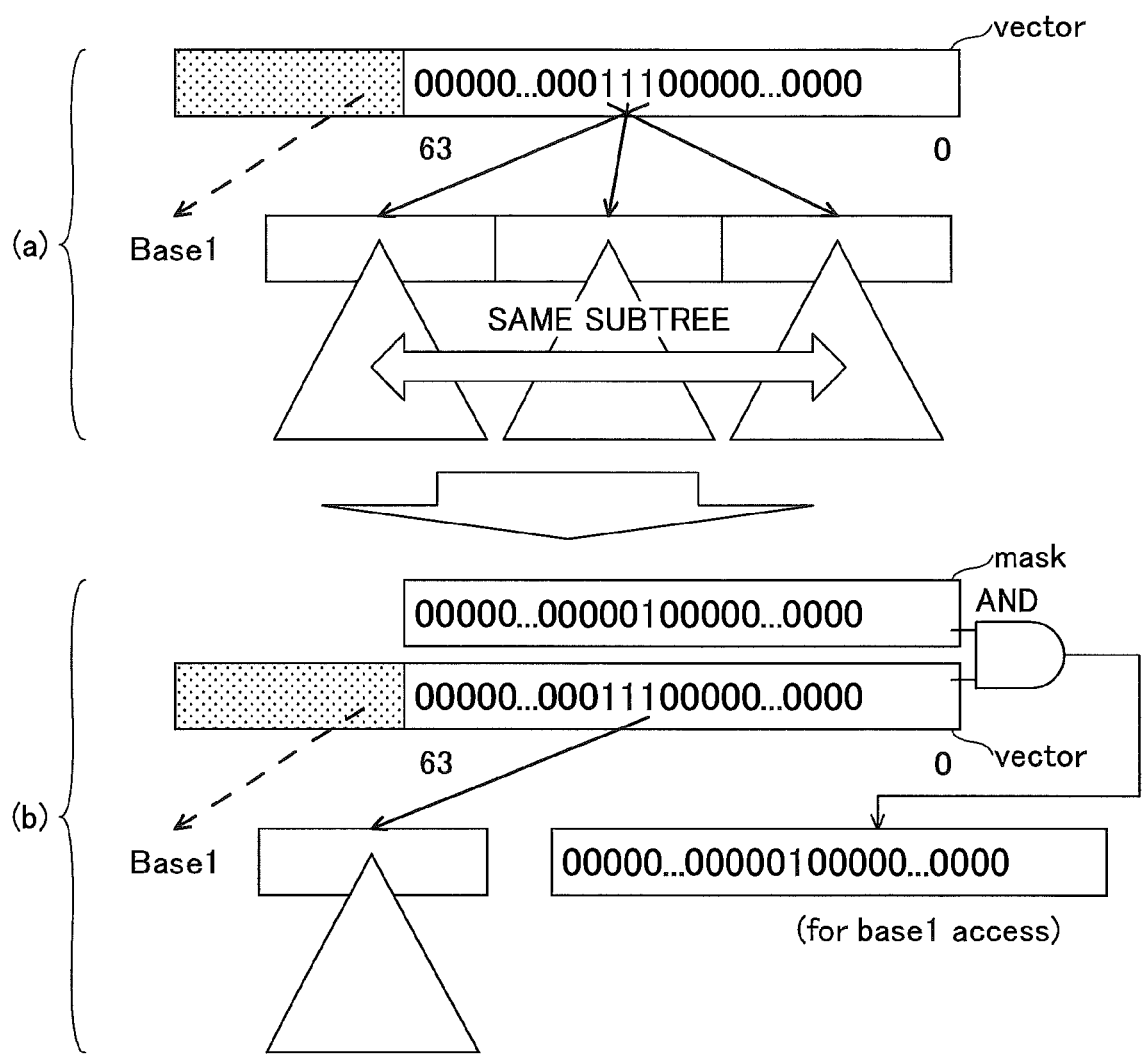
FIG. 13 is a diagram for explaining a compression example of data of an internal node.

The mask can be also applied to compression of internal nodes. As example in which the mask is applied to compression of internal nodes is described with reference to FIG. 13. Like FIG. 6, FIG. 13 shows an example in which the chunk length is 6 bits, that is, the vector is 64 ($2^6$) bits. Also in this example, the mask is added in addition to the vector, the base0 and the base1 described in the example 1. The bit length of the mask is the same as that of the vector.

Also, as to internal nodes of each stage, only the first internal node at which consecution starts is held for consecutive internal nodes having the same value. In the example of FIG. 13, as indicated by (a), there are 3 internal nodes having the same sub-tree. In this case, as indicated by (b), only the first internal node among the three is held. As a result of such a compression, even when there are a plurality of internal nodes, a plurality of internal nodes having the same value are not included.

The element of the mask is a bit of 0 or 1, and 1 is assigned at a bit corresponding to a position at which consecution of internal nodes before compression starts, from the right end, and 0 (mask) is assigned at positions of consecutive internal nodes having the same value from the start position. Also, in the case in which consecution, ends so that an internal node of another value starts (when an internal node changes), 1 is set at the position.

In the example of FIG. 13, since three internal nodes are consecutive, 1 is set at a bit position corresponding to the first internal node, and 0, which is a mask, is set at bit positions corresponding to internal nodes afterwards. That is, as shown, in FIG. 13(b), the bit of the mask corresponding to the first 1 of the vector is 1, and bits of the mask corresponding to the next 1 and further next 1 are 0. The usage of the mask is as follows.

When the calculation unit 11 detects that a bit (it is assumed to be a v-th bit counted from 0-th bit) of the vector corresponding to a chunk is 1, the calculation unit 11 ascertains that the child is an internal node. The calculation unit 11 performs AND calculation on the vector and the mask, and the calculation unit 11 calculates the number of bits of 1 in the bits (v+1 bits) counted from the 0-th bit of the right end up to the v-th bit of the vector on which AND calculation has been performed. Assuming that the number is bc, the calculation unit 11 accesses an internal node of an index of (bc+base1−1).

EXAMPLE 4

Figure 14:
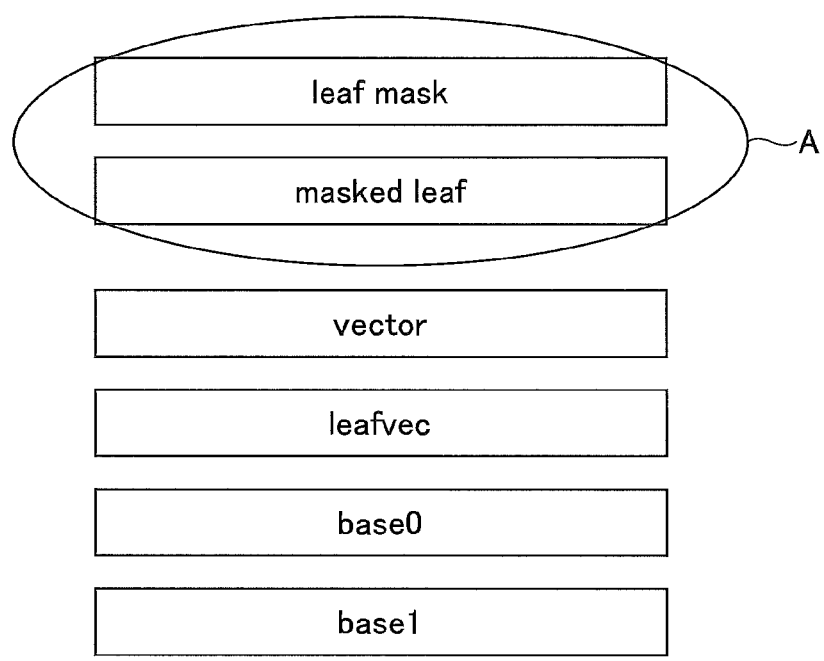
FIG. 14 is a diagram showing a data structure of an internal node when a leaf mask is applied.

Next, an example 4 is described. The example 4 is a scheme by which leaf nodes can be further compressed than the embodiments 2 and 3. The structure of internal data in the example 4 is shown in FIG. 14. As shown in FIG. 14, in the internal data of the example 4, a leaf mask and a masked leaf are added as shown by "A" in addition to the vector, the leafvec, the base0 and the base1. A node array and a leaf array are stored in the storage unit 12.

The leaf mask is data, consisting of 0/1 bits, having a bit length the same as that of the vector. The masked leaf is data of a leaf node. In the following, operation of the calculation unit 11 when using the leaf mask and the masked leaf is described.

Figure 15:
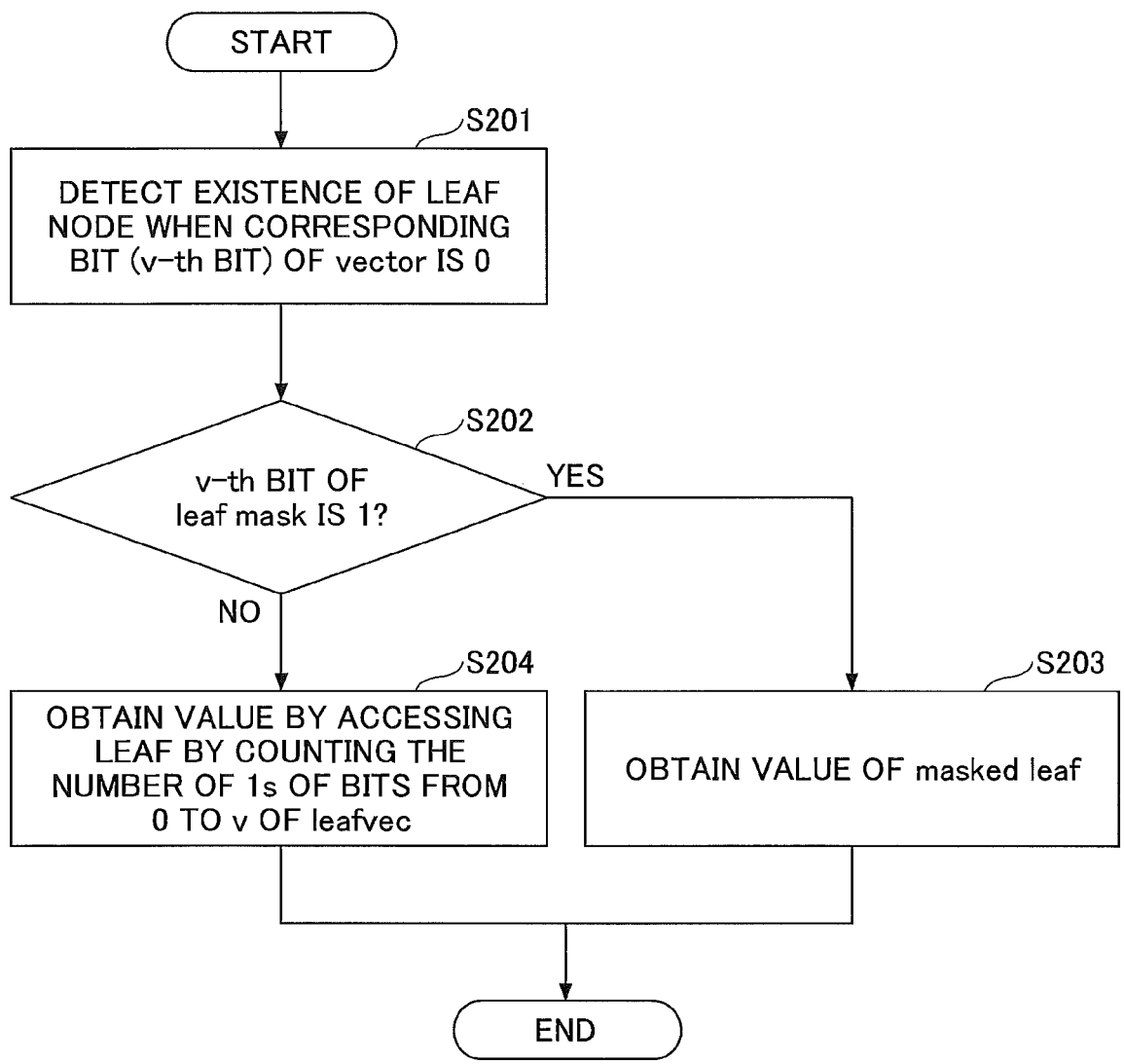
FIG. 15 is a flowchart of processing for obtaining a value of a leaf when using a leaf mask.

An operation example of the calculation unit 11 of the search apparatus 10 in the example 4 is described with reference to the flowchart of FIG. 15. FIG. 15 is especially for describing parts of processing that are different from those of the examples 1 and 2.

In step 201, the calculation unit 11 detects that it transits to a leaf node by detecting that the corresponding bit of the vector of the current chunk (the v-th bit counted from the 0-th bit) is 0.

In step 202, the calculation unit 11 determines whether the v-th bit counted from the 0-th bit in the leaf mask is 1. When this is 1 (Yes in step 202), the calculation unit 11 obtains the value of the masked leaf as a value of the leaf node (step 203).

In step 202, when the v-th bit is not 1 (No in step 202), in the same way as the example 2, the calculation unit 11 calculates the number (bc) of 1s from the 0-th bit to the v-th bit of the leafvec, and obtains a value by accessing a leaf node of an index of (bc+base0−1).

Next, a method for generating data related to the leaf mask in the example 4 is described with reference to FIG. 16. Generation of data described below may be performed by the search apparatus 10 or may be performed by another apparatus (computer). In the following, an apparatus that generates data is called a generation apparatus. The generation apparatus is the search apparatus 10 or another apparatus. When the generation apparatus is another apparatus, after the data is generated, the generated data is stored in the storage unit 12 of the search apparatus 10.

First, the generation apparatus calculates a leaf array without compression. Accordingly, for example, as to a quad tree, as shown by L of FIG. 5 for example, data of leaf nodes whose indices are consecutive is generated for each internal node of the parent.

Also, as a 64 branching tree, the number of items of the leaf array becomes 64 at the maximum for each internal node of the parent. Also, for example, in an example of a 16 branching tree, when there are three kinds of leaf information, which are A, B and C, leaf information is arranged in the leaf array like ABAA BBBA BCBB CCCC, for example, as shown in FIG. 16(a).

Next, the generation apparatus selects leaf information to be masked. In this example, B is omitted by masking it. In general, it is effective to mask information for which consecutive fragments appear most frequently. Thus, the generation apparatus determines to mask B for which consecutive fragments appear most frequently. Note that "consecutive fragments" includes the case of one like B in ABA. The information B of the masked leaf is stored in the masked leaf.

Next, the generation apparatus stores a slot where masked leaf information appears in the leaf mask. The "slot where masked leaf information appears" corresponds to a bit position corresponding to the leaf in the vector. For example, in the case in which the vector is 0010, when a leaf corresponding to a bit 0 of the second slot counted from the left end as the first bit is masked, 0100 is stored in the leaf mask.

Also, the generation apparatus makes the slot of the masked leaf information to be the same as the previous value in the leaf array. Accordingly, from the leaf information shown in FIG. 16(a), "leaf mask: 0100 1110 1011 0000" is obtained and "leaf array: AAAA AAAA ACCC CCCC" is obtained as shown in FIG. 16(b). Note that, in this example, since big endian is used, the count is performed from the left end. In FIG. 16(b), the underlined parts are masked parts, which are values the same as previous values (left values) in the counting direction.

Next, in the same way as the case without leaf mask, consecutive parts are compressed. Accordingly, as shown in FIG. 16(c), "leafvec: 1000 0000 0100 0000" is obtained and "leaf array: AC" is obtained.

As a result of the above-mentioned processing, as shown in FIG. 16(d), "leaf mask: 0100 1110 1011 0000", "masked leaf: B", "leaf vector: 1000 0000 0100 0000", and "leaf array: ACj" are obtained.

For reference, the leaf array when compressed without the leaf mask is "ABABABCBC", indicating that a high compression effect can be obtained by the example 4.

In the example 4, although one mask (example: 64 bits) and one leaf are added, some inconsecutive leafs can be omitted, so that further compression of the leaf array can be realized. This becomes especially effective when the leaf array is divided to many parts by next hop values (like stripes), or when the size of one leaf (size of one entry of the leaf array) is large, such as 16 bytes.

Note that examples 2, 3 and 4 show examples for compressing leaf nodes, however, internal nodes having the same value can be also compressed like the case of the leaf nodes. Also, both of compression of leaf nodes and compression of internal nodes may be performed.

Effects of Embodiments

As described above, in the present embodiment, the data amount of the tree can be largely reduced. Therefore, for example, search processing can be performed by storing search target data in a cache (example: L1, L2, L3 cache) of a general-purpose CPU, so that high speed search processing can be realized. Especially, as an example, when the search target data is a routing table, the problem that performance deteriorates when the number of routes in the routing table becomes large is solved. Also, since the processing speed increases, it is also possible to solve the problem that performance deteriorates when the address length becomes long.

Also, at each level of the tree, since presence or absence of a partial tree is expressed bit by bit, memory efficiency is good. Especially, as an example, when using a 64 branching tree, since presence or absence (child arrangement) of a partial tree is represented by 64 bits at a time, there is a characteristic that the processing efficiency of the 64-bit CPU is good.

Also, in the vector and the like, the number of bits of 1 is counted, so that the corresponding child in the array can be accessed by one step. Thus, high speed processing can be realized and memory efficiency is good. Also, since the number of bits of 1 is counted, the popcnt CPU instruction and high speed processing can be realized. Also, since the present technique is based on a general-purpose multiway tree (multiway trie), the present technique has high extensibility and flexibility, and it is applicable not only to route table search but also various searches.

Further, by performing compression of leaf information described in the examples 2~4, the amount of search target data can be reduced and further speeding up can be realized.

As an example, by using the technique of the present embodiment, with a general-purpose CPU having the popcnt CPU instruction, about 240 Mlps for single core and about 910 Mlps for 4 cores can be realized for a routing table that holds 500 thousand IPv4 full-route routes. Without using TCAM, the general-purpose CPU can achieve performance the same as TCAM or several times better than TCAM.

Summary of Embodiment

As described above, according to the present embodiment, there is provided a search apparatus including:
storage means configured to store search target data; and
calculation means configured to perform search processing for the search target data based on key data, wherein
the search target data stored in the storage means is data of a multiway tree structure including an internal node array and a leaf node array,
each internal node in the search target data includes a bit vector representing whether a transition destination is an internal node or a leaf node by a bit, and wherein
the calculation means is configured to repeatedly execute, until a transition node becomes a leaf node, processing of
obtaining a chunk of a predetermined bit length from the key data, determining whether a transition destination from the internal node is an internal node or a leaf node based on a bit, in the bit vector of the accessing internal node, that corresponds to a value of the chunk, and accessing a node of the transition destination.

Each internal node in the search target data includes first base information indicating a storing position of an internal node of a transition destination, and second base information indicating a storing position of a leaf node of a transition destination, and the calculation means may be configured, when the transition destination determined based on the value of the bit of the bit vector is an internal node, to access the internal node of the transition destination using the first base information, and when the transition destination is a leaf node, to access the leaf node of the transition destination using the second base information.

For each internal node in the search target data, internal nodes that become transition destinations are stored in the internal node array in which storing positions are consecutive, and leaf nodes that become transition destinations are stored in the leaf node array in which storing positions are consecutive, and the calculation means may be configured, when the transition destination determined based on the value of the bit of the bit vector is an internal node, to access the internal node of the transition destination using the first base information and the number of bits indicating an internal node in the bit vector, and when the transition destination is a leaf node, to access the leaf node of the transition destination using the second base information and the number of bits indicating a leaf node of the bit vector.

As to each internal node in the search target data, leaf nodes that become transition destinations are stored in the leaf node array in which storing positions are consecutive, leaf nodes having the same value are compressed, and a plurality of leaf nodes do not include leaf nodes having the same value, each internal node in the search target data includes a leaf vector having a bit indicating a storing position at which a value of a leaf node before compression changes, and the calculation means may be configured, when the transition destination determined based on the value of the bit of the bit vector is a leaf node, to access the leaf node of the transition destination using the second base information and the number of bits indicating the storing position in the leaf vector.

The calculation means may be configured to check the bit vector first between the bit vector and the leaf vector, and to use the leaf vector based on the value of the bit of the bit vector.

As to each internal node in the search target data, leaf nodes that become transition destinations are stored in the leaf node array in which storing positions are consecutive, leaf nodes having the same value are compressed, and a plurality of leaf nodes do not include leaf nodes having the same value, each internal node in the search target data includes a mask vector having a bit indicating a storing position at which a value of a leaf node before compression changes, and the calculation means may be configured, when the transition destination determined based on the value of the bit of the bit vector is a leaf node, to access the leaf node of the transition destination using the second base information and the number of bits indicating leaf nodes in the bit vector masked by the mask vector.

As to each internal node in the search target data, internal nodes that become transition destinations are stored in the internal node array in which storing positions are consecutive, internal nodes having the same value are compressed, and a plurality of internal nodes do not include internal nodes having the same value, each internal node in the search target data includes a mask vector having a bit indicating a storing position at which a value of an internal node before compression changes, and the calculation means may be configured, when the transition destination determined based on the value of the bit of the bit vector is an internal node, to access the internal node of the transition destination using the first base information and the number of bits indicating internal nodes in the bit vector masked by the mask vector.

As to each internal node in the search target data, leaf nodes having the same value are compressed after a predetermined value is masked in leaf nodes that become transition destinations and the masked value is changed to a different value, so that a plurality of leaf nodes do not include leaf nodes having the same value, and stored in the leaf node array in which storing positions are consecutive, each internal node in the search target data includes the masked predetermined value, a leaf mask having a bit indicating a position of the leaf vector having the predetermined value before compression, and a leaf vector having a bit indicating a storing position at which a value of a leaf node before compression changes, and the calculation means may be configured, when the transition destination determined based on the value of the bit of the bit vector is a leaf node, to determine whether a bit is set in the leaf mask at a position the same as that of the bit in the bit vector, obtain the predetermined value as a value of the leaf node of the transition destination when the bit is set, and access the leaf node of the transition destination using the second base information and the number of bits indicating the storing position in the leaf vector when the bit is not set.

The calculation means may be configured to calculate the number of bits using a popcnt command of a CPU configured by the calculation means.

The calculation means and the storage means may be configured on a 64 bit CPU, and the chunk may be a 6 bit length, and the bit vector may be a 64 bit length.

Also, the calculation means and the storage means are configured on a 64 bit CPU, the chunk is a 6 bit length, and the bit vector is a 64 bit length, and the calculation means may be configured to calculate the number of the bits using a popcnt command of the 64 bit CPU, and to access a node of the transition destination using an offset, from base information, based on the number of the bits.

The calculation means may be configured to obtain a chunk of a bit length longer than the predetermined bit length from the key data, and directly reach a leaf node by performing search using the chunk.

Also, according to the present embodiment, a program that causes a computer to function as each means in the search apparatus can be provided. Also, according to the present embodiment, a computer readable recording medium storing the search target data can be provided.

Note that the above-described "storage means" may be replaced with any one of a storage unit, a storage circuit and a storage device. Also, the above-described, "calculation means" may be replaced with any one of a calculation unit, a calculation circuit and a calculation device.

Also, a search method of the present embodiment may be configured as a search method for performing search processing on search target data based on key data, wherein the search target data is data of a multiway tree structure including an internal node array and a leaf node array, each internal node in the search target data includes a bit vector representing whether a transition destination is an internal node or a leaf node by a bit, the search method including: repeatedly executing, until a transition node becomes a leaf node, processing of obtaining a chunk of a predetermined bit length from the key data, determining whether a transition destination from the internal node is an internal node or a leaf node based on a bit, in the bit vector of the accessing internal node, that corresponds to a value of the chunk, and accessing a node of the transition destination.

The present invention is not limited to the specifically disclosed embodiments, and variations and modifications may be made without departing from the scope of the claims.

The present patent application claims priority based on Japanese patent application No. 2015-048657, filed in the JPO on Mar. 11, 2015, and the entire contents of the Japanese patent application No. 2015-048657 are incorporated herein by reference.

DESCRIPTION OF REFERENCE SIGNS 10, 20 search apparatus
11 calculation unit
12 storage unit
13 input unit
14 output unit
21 packet processing unit
22 destination determination unit

The invention claimed is:

1. A search apparatus comprising:
a memory configured to store search target data; and
processing circuitry configured to
perform search processing for the search target data based on key data, wherein
the search target data stored in the memory is data of a multiway tree structure including an internal node array and a leaf node array,
each internal node in the search target data includes (i) a bit vector representing whether a transition destination is an internal node, which is an intermediate node for the key data, or a leaf node, which is a last destination node of the key data, (ii) first base information indicating a storing position of an internal node of a transition destination, and (iii) second base information indicating a storing position of a leaf node of a transition destination, wherein the bit vector includes a plurality of bit positions, the number of which is the number of branches from an internal node and each of the plurality of bit positions being a separate indicator for whether a respective one of the branches is an internal node or a leaf node based on a binary value of the bit stored at the respective bit position,
and wherein
the processing circuitry is configured to repeatedly execute, until a transition node becomes a leaf node, processing of
obtaining a chunk of a predetermined bit length from the key data that identifies a transition destination from the internal node being searched for, the chunk being an integer number value represented by the sequence of bits in the chunk, determining one of the plurality of bit positions in the bit vector that the chunk is referring to based on the integer number value, and determining whether the transition destination from the internal node is an internal node or a leaf node based on the value of the bit stored at the determined one of the plurality of bit positions in the bit vector of the accessing internal node, and when the transition destination determined based on the value of the bit of the bit vector is an internal node, accessing the internal node of the transition destination using counts of one or more bits indicating an internal node in the bit vector and a storing position indicated by the first base information, and when the transition destination is a leaf node, accessing the leaf node of the transition destination using counts of one or more bits indicating a leaf node in the bit vector and a storing position indicated by the second base information.

2. The search apparatus as claimed in claim 1, wherein, for each internal node in the search target data, internal nodes that become transition destinations are stored in the internal node array in which storing positions are consecutive, and leaf nodes that become transition destinations are stored in the leaf node array in which storing positions are consecutive, and wherein the processing circuitry is configured, when the transition destination determined based on the value of the bit of the bit vector is an internal node, to access the internal node of the transition destination using the first base information and the number of bits indicating an internal node in the bit vector, and when the transition destination is a leaf node, to access the leaf node of the transition destination using the second base information and the number of bits indicating a leaf node of the bit vector.

3. The search apparatus as claimed in claim 1, wherein, as to each internal node in the search target data, leaf nodes that become transition destinations are stored in the leaf node array in which storing positions are consecutive, leaf nodes having the same value are compressed, and a plurality of leaf nodes do not include leaf nodes having the same value, each internal node in the search target data includes a leaf vector having a bit indicating a storing position at which a value of a leaf node before compression changes, and wherein the processing circuitry is configured, when the transition destination determined based on the value of the bit of the bit vector is a leaf node, to access the leaf node of the transition destination using the second base information and the number of bits indicating the storing position in the leaf vector.

4. The search apparatus as claimed in claim 3, wherein the processing circuitry is configured to check the bit vector first between the bit vector and the leaf vector, and to use the leaf vector based on the value of the bit of the bit vector.

5. The search apparatus as claimed in claim 1, wherein, as to each internal node in the search target data, leaf nodes that become transition destinations are stored in the leaf node array in which storing positions are consecutive, leaf nodes having the same value are compressed, and a plurality of leaf nodes do not include leaf nodes having the same value, each internal node in the search target data includes a mask vector having a bit indicating a storing position at which a value of a leaf node before compression changes, and wherein the processing circuitry is configured, when the transition destination determined based on the value of the bit of the bit vector is a leaf node, to access the leaf node of the transition destination using the second base information and the number of bits indicating leaf nodes in the bit vector masked by the mask vector.

6. The search apparatus as claimed in claim 1, wherein, as to each internal node in the search target data, internal nodes that become transition destinations are stored in the internal node array in which storing positions are consecutive, internal nodes having the same value are compressed, and a plurality of internal nodes do not include internal nodes having the same value,
   each internal node in the search target data includes a mask vector having a bit indicating a storing position at which a value of an internal node before compression changes, and wherein
   the processing circuitry is configured, when the transition destination determined based on the value of the bit of the bit vector is an internal node, to access the internal node of the transition destination using the first base information and the number of bits indicating internal nodes in the bit vector masked by the mask vector.

7. The search apparatus as claimed in claim 1, wherein, as to each internal node in the search target data, leaf nodes having the same value are compressed after a predetermined value is masked in leaf nodes that become transition destinations and the masked value is changed to a different value, so that a plurality of leaf nodes do not include leaf nodes having the same value, and stored in the leaf node array in which storing positions are consecutive,
   each internal node in the search target data includes the masked predetermined value, a leaf mask having a bit indicating a position of the leaf vector having the predetermined value before compression, and a leaf vector having a bit indicating a storing position at which a value of a leaf node before compression changes, and wherein
   the processing circuitry is configured, when the transition destination determined based on the value of the bit of the bit vector is a leaf node,
   to determine whether a bit is set in the leaf mask at a position the same as that of the bit in the bit vector, obtain the predetermined value as a value of the leaf node of the transition destination when the bit is set, and access the leaf node of the transition destination using the second base information and the number of bits indicating the storing position in the leaf vector when the bit is not set.

8. The search apparatus as claimed in claim 2, wherein the processing circuitry is configured to calculate the number of bits using a popcnt command.

9. The search apparatus as claimed in claim 1, wherein the processing circuitry and the memory are configured on a 64 bit CPU.

10. The search apparatus as claimed in claim 1, wherein the chunk is a 6 bit length, and the bit vector is a 64 bit length.

11. The search apparatus as claimed in claim 2, wherein the processing circuitry and the memory are configured on a 64 bit CPU, the chunk is a 6 bit length, and the bit vector is a 64 bit length, and wherein
   the processing circuitry is configured to calculate the number of the bits using a popcnt command of the 64 bit CPU, and to access a node of the transition destination using an offset, from base information, based on the number of the bits.

12. The search apparatus as claimed in claim 1, wherein the processing circuitry is configured to obtain a chunk of a bit length longer than the predetermined bit length from the key data, and directly reach a leaf node by performing search using the chunk.

13. A search method for performing search processing on search target data based on key data, wherein the search target data is data of a multiway tree structure including an internal node array and a leaf node array,
   each internal node in the search target data includes (i) a bit vector representing whether a transition destination is an internal node, which is an intermediate node for the key data, or a leaf node, which is a last destination node of the key data, (ii) first base information indicating a storing position of an internal node of a transition destination, and (iii) second base information indicating a storing position of a leaf node of a transition destination, wherein the bit vector includes a plurality of bit positions, the number of which is the number of branches from an internal node and each of the plurality of bit positions being a separate indicator for whether a respective one of the branches is an internal node or a leaf node based on a binary value of the bit stored at the respective bit position,
   the search method comprising: repeatedly executing, until a transition node becomes a leaf node, processing of
   obtaining a chunk of a predetermined bit length from the key data that identifies a transition destination from the internal node being searched for, the chunk being an integer number value represented by the sequence of bits in the chunk, determining one of the plurality of bit positions in the bit vector that the chunk is referring to based on the integer number value, and determining whether the transition destination from the internal node is an internal node or a leaf node based on the value of the bit stored at the determined one of the plurality of bit positions in the bit vector of the accessing internal node, and
   when the transition destination determined based on the value of the bit of the bit vector is an internal node, accessing the internal node of the transition destination using counts of one or more bits indicating an internal node in the bit vector and a storing position indicated by the first base information, and when the transition destination is a leaf node, accessing the leaf node of the transition destination using counts of one or more bits indicating a leaf node in the bit vector and a storing position indicated by the second base information.

14. A non-transitory computer readable medium that stores a program that when executed by a search apparatus that includes a memory configured to store search target data and processing circuitry, causes the search apparatus to perform a method comprising:
   performing search processing for the search target data based on key data, wherein
   the search target data stored in the memory is data of a multiway tree structure including an internal node array and a leaf node array,
   each internal node in the search target data includes (i) a bit vector representing whether a transition destination is an internal node, which is an intermediate node for the key data, or a leaf node, which is a last destination node of the key data, (ii) first base information indicating a storing position of an internal node of a transition destination, and (iii) second base information indicating a storing position of a leaf node of a transition destination, wherein the bit vector includes a plurality of bit positions, the number of which is the number of branches from an internal node and each of the plurality of bit positions being a separate indicator for whether a respective one of the branches is an internal node or a leaf node based on a binary value of the bit stored at the respective bit position, and wherein the method includes repeatedly executing, until a transition node becomes a leaf node, processing of obtaining a chunk of a predetermined bit length from the key data that identifies a transition destination from the internal node being searched for, the chunk being an integer number value represented by the sequence of bits in the chunk, determining one of the plurality of bit positions in the bit vector that the chunk is referring to based on the integer number value, and determining whether the transition destination from the internal node is an internal node or a leaf node based on the value of the bit stored at the determined one of the plurality of bit positions in the bit vector of the accessing internal node, and when the transition destination determined based on the value of the bit of the bit vector is an internal node, accessing the internal node of the transition destination using counts of one or more bits indicating an internal node in the bit vector and a storing position indicated by the first base information, and when the transition destination is a leaf node, accessing the leaf node of the transition destination using counts of one or more bits indicating a leaf node in the bit vector and a storing position indicated by the second base information.

* * * * *